United States Patent [19]

Koenck et al.

[11] Patent Number: 5,487,161
[45] Date of Patent: Jan. 23, 1996

[54] COMPUTERIZED DATA TERMINAL WITH SWITCHABLE MEMORY ADDRESS FOR START-UP AND SYSTEM CONTROL INSTRUCTIONS

[75] Inventors: Steven E. Koenck, Cedar Rapids; Rickey G. Austin, Lisbon; Darrell L. Boatwright, Cedar Rapids, all of Iowa

[73] Assignee: Norand Corp., Cedar Rapids, Iowa

[21] Appl. No.: 982,303

[22] Filed: Nov. 25, 1992

[51] Int. Cl.[6] .................................................. G06F 12/02
[52] U.S. Cl. ...................... 395/442; 395/421.01; 395/700
[58] Field of Search ................................. 395/425, 400, 395/700

[56] References Cited

U.S. PATENT DOCUMENTS

| | | | |
|---|---|---|---|
| 4,523,297 | 6/1985 | Ugon et al. | 364/900 |
| 4,626,986 | 12/1986 | Mori | 395/700 |
| 5,227,614 | 7/1993 | Danielson et al. | 235/380 |
| 5,307,505 | 4/1994 | Houlberg et al. | 395/800 |

Primary Examiner—David L. Robertson
Attorney, Agent, or Firm—Simmons, Perrine, Albright & Ellwood

[57] ABSTRACT

A microprocessor circuit of a computerized data collection terminal includes the microprocessor and reprogrammable flash read only memory at memory address locations from which normally start-up and control instructions would be retrieved. A connector port is coupled to the microprocessor circuit through which additional memory, for example in the form of a memory card, may be temporarily and removably coupled into the circuit. A special purpose memory card includes start-up and control instructions to start and operate the microprocessor. The data collection terminal includes a special switch which, when activated, causes the rerouting of start-up code requests by the microprocessor from the memory locations of the reprogrammable flash memory to locations on the special purpose memory card. The special purpose memory card also contains program instructions for copying the microprocessor start-up and system control instructions from the special purpose memory card to the memory locations of the reprogrammable flash memory of the microprocessor circuit of the terminal. Switching the address of start-up and control code from the internal memory locations to the externally supplied memory locations allows the data collection terminal to be manufactured and assembled and to be programmed for a specific purpose after assembly.

18 Claims, 4 Drawing Sheets

40 — START-UP RESIDENT SYSTEM CODE
41 — EXECUTE REPROGM
42 — TRANSFER SYSTEM CODE TO RAM
43 — ROUTE CODE REQUEST TO RAM
44 — WRITE NEW SYSTEM CODE INTO FLASH ROM
45 — SHUTDOWN

Fig.3.

52 — INSERT REPROGM SWITCH "S"
53 — START-UP EXTERNAL SYSTEM CODE
54 — WRITE NEW SYSTEM CODE INTO FLASH ROM
55 — SHUTDOWN
56 — REMOVE REPROGM SWITCH "N"
57 — START-UP NEW RESIDENT SYSTEM CODE

COMPUTERIZED DATA TERMINAL WITH SWITCHABLE MEMORY ADDRESS FOR START-UP AND SYSTEM CONTROL INSTRUCTIONS

BACKGROUND OF THE INVENTION

This invention relates generally to computerized data terminals. The term "Computerized Data Terminal" as used herein includes various microprocessor controlled data processing apparatus. The invention is advantageously applied to a type of computerized data processing and communication apparatus known as portable data collection terminals. These units are typically self-contained, are battery powered and are either batch processing units, hence intermittently linked, or are primary communication units linked on a real time basis to a major business information system. The data collection terminals are the "tentacles" of such a business information system, the system relying on data interchange through a relatively large number of these data collection terminals for real time transactions, inventory, marketing activity, route delivery or other pertinent business information.

Starting on a premise of a direct relationship between the commercial success of such data collection terminals and their application in a number of different business systems, the success of the terminals seems to depend on the adaptability of the data collection terminals to a relatively large number of specifically tailored application formats. Adapting to a variety of different systems has been found, however, to generally increase the cost of the terminals. As a result of cost reduction efforts, modularity concepts have been implemented in some instances. Data collection terminals are adapted to a special use by composing them from a number of standard modules, and providing certain specialized modules which are compatible with standard base modules. The use of common modules and only a limited use of special function modules tends to contain costs while allowing more dedicated uses for the data collection terminals. The present invention seeks to increase the functional adaptability of data terminals by further streamlining the physical assembly of data terminals with a greater commonality of parts, while increasing adaptability of the data terminals to distinct operating requirements. The present invention also provides a simple mechanism for repairing or updating microprocessor control instructions, or programs in general, which are resident within data terminals.

Electrically programmable and erasable, hence reprogrammable Read Only Memory (ROM) devices, such as memory devices known as "flash memory" or flash ROM devices, are known in the art. These data storage devices have found use in personal computers. Known advantages are the ability to perform updating or reprogramming operations on resident microprocessor control programs. In the past, microprocessor start-up logic instructions and, more generally, control programs typically resided in ROM. If a programming error was found in the microprocessor start-up instructions or ROM resident control programs, the ROM device had to be physically replaced with a corrected device. Repair typically required affected units to be returned to a repair shop.

Recent advances in the art of reprogrammable flash ROM has brought about a practice of using such reprogrammable ROM at address locations which are initially addressed by the microprocessor during start-up and also those at which control programs for the microprocessor are routinely stored. This locates the start-up instructions for the microprocessor in reprogrammable flash ROM locations rather than in typically permanent ROM. Information input devices, such as magnetic disk drives or, more recently, memory card connection devices may be used to update memory resident microprocessor control programs to change or correct earlier versions thereof. Consequently, updates to the control programs, even updates to the start-up instructions for the microprocessor, may be made in the field, at user locations, without physically replacing ROM devices.

To implement a change in the control code according to known practice, the computer would be started normally, using the start-up instructions and control code as they currently reside in reprogrammable memory such as in flash ROM, for example. A reprogramming program would be read into read-write Random Access Memory (RAM). The reprogramming program may provide microprocessor control instructions as needed or may cause needed control code to be written into RAM and cause microprocessor control code request to be read from those particular RAM locations rather than from the flash memory. The reprogramming program then causes updated start-up or control program code to be stored into the original flash ROM resident memory locations assigned to the start-up instructions or other control code. After shut-down of the microprocessor device, a subsequent start-up and operation of the microprocessor takes place under the updated code.

The described control code updating routine has a significant disadvantage. Any malfunction while programming the updated start-up instructions or other control code may prevent the microprocessor on a subsequent power up routine from becoming operational, rendering the data terminal inoperative. Even the reprogramming program which would normally cause corrected code to be loaded into the flash ROM may not run in the absence of a functional microprocessor device. Thus, even though an affected terminal contains reprogrammable ROM, it cannot be accessed to be reprogrammed or repaired. Only physical replacement of the memory with a pre-programmed replacement memory device would restore the affected data terminal to service.

In an attempt to overcome the described risk of failure, data terminals with reprogrammable flash ROM to store start-up and system code have been provided with masked or permanent ROM devices which contain an alternate start up code and a control program to reprogram the reprogrammable flash memory device with start-up and control code. The added ROM provides a solution to the problem presented by an inadvertent destruction of the start-up sequence. However, the additional ROM only increases space and cost problems, particularly with respect to comparatively compact, hand-held or portable computerized data units which are also referred to as data collection terminals. These latter terminals are desirably compact and lightweight, in that they are carried about in warehouses, in shipping yards, at point of sale locations, and so forth. In addition to adding cost and using space, the always included, permanent ROM is permanently programmed with a reprogramming program which is itself inflexible and consequently lacks an adaptability to change.

It is desirable to provide a data terminal which overcomes the above-described shortcomings in existing computerized data terminals.

SUMMARY OF THE INVENTION

It is therefore an object of the invention to provide a data terminal unit which is reprogrammable even when its existing resident microprocessor start-up instructions have become defective.

It is a further object of the invention to provide a data terminal unit which includes a provision for being programmed with application specific control code subsequent to its physical assembly.

Another object of the invention is to provide a computerized data terminal unit having an external control of a microprocessor device which in turn controls the operation of the data terminal unit.

Still another object of the invention is to provide a computerized data terminal unit with user-selectable access to resident and substitute microprocessor control memory sections.

According to the invention a data terminal unit includes a microprocessor device and reprogrammable memory interactively coupled to the microprocessor device, the memory being addressable by the microprocessor device for microprocessor start-up and control instructions. The data terminal unit includes data input means for removably coupling microprocessor addressable code storage means to the data terminal unit. The data terminal further includes switchable coupling means for selectively readdressing memory to access microprocessor start-up and control instructions in substitution for code from the reprogrammable memory.

Various other features and advantages of the data terminal in accordance with the invention will become apparent from the following detailed description, which may be best understood when read with reference to the appended drawings.

DETAILED DESCRIPTION OF THE INVENTION

Figure 1:
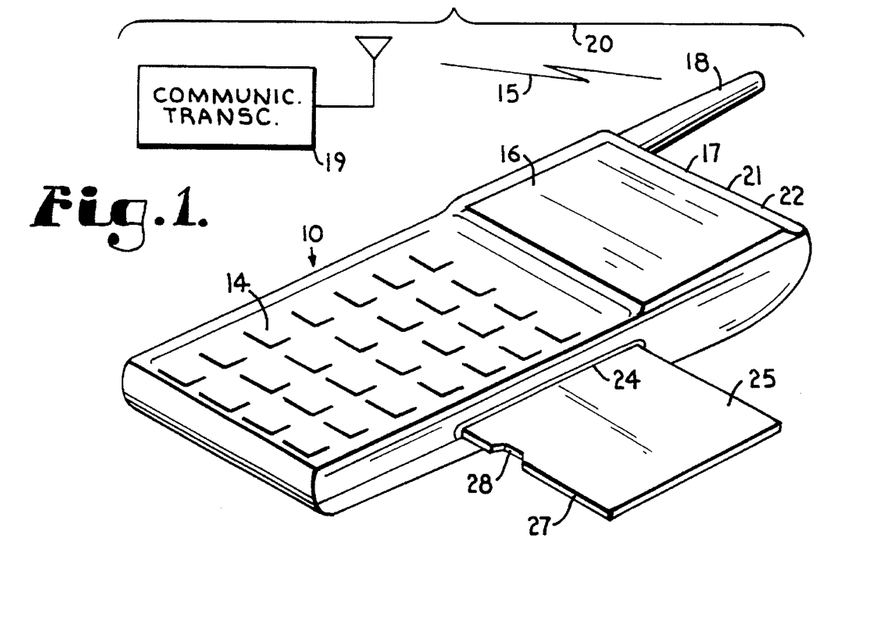
FIG. 1 is a pictorial representation of a data terminal including features of the invention.

In reference to FIG. 1, there is shown apparatus which depicts a portable or hand-held data collection terminal 10 as a preferred example of a computerized data terminal, or, generally, a microprocessor controlled apparatus to which the present invention applies. As will become apparent from the further description of the features of the data collection terminal 10, various types of microprocessor controlled apparatus, including computers may be improved by including the features of the present invention. Similar hand-held data collection terminals that do not include the features of the present invention as further described have already found wide application in various business systems and are generally known. The data collection terminal 10 includes, as is typical for most such devices, a keyboard 14 and a display 16. The data collection terminal 10 is depicted as being equipped with a communication peripheral device, such as radio transceiver module 17 with an antenna 18. The transceiver module 17 enables the data collection terminal 10 to communicate on a real time basis with a stationary RF communication module 19 (COMMUNIC. TRANSC.) of a typical business system as depicted schematically by a link 15. The data collection terminal 10 may include other peripherals, such as a bar code reader 21, preferably also disposed at an upper end 22 of the data collection terminal 10. The peripherals, such as the keyboard 14, the display 16, the transceiver 17 or other devices, would be electrically interconnected and communicatively interact via a microprocessor control circuit as, for example, the microprocessor control circuit 23 shown schematically in FIG. 4.

A real time communications link desirably ties each of a great number of data collection terminals 10 into the system 20 to provide a central data processing center (not shown) of the system with continuously updated information. However, it is the ability of the data collection terminals 10 to perform basic data processing operations at the terminal level, or to store current inventory information for batch type transfer to the business system only during designated time slots, that has been found to significantly enhance the effectiveness of the business system 20. To support data processing and adequate local data storage capacity, the data collection terminal 10 is computerized and is provided with ample memory. The data collection terminal 10 desirably features a known connector port 24 for removably coupling a memory card, which may be a standard memory extension card or a special purpose card 25. The term special purpose card or special purpose memory card 25, as applied herein, is used with a special meaning, namely that of a microprocessor start-up card 25. Standard memory cards are available with particular software programs pre-programmed thereon, which therefore may be considered to serve a special purpose of making the particular program available to a respective apparatus. However, the standard memory cards function in a known manner in that they serve to provide application instructions only after a microprocessor has become operational. A standard memory extension card (see, for example, FIG. 5) may contain random access memory (ROM) or software programs such as electronic spread sheets, for example. The standard memory card may contain a particular operating program and, in addition, pre-programmed, semi-permanent data specific to the particular use of the data collection terminal 10 within the system 20. For example, in a retailing operation, a respective memory card may contain pre-programmed information relating operator-identifiable merchandise descriptions of all currently inventoried store items to respective bar code numbers. In a car rental operation, pre-programmed information may relate a bar code number or a license tag number to a full description of a corresponding car, including its most recent mechanical condition. A pre-programmed routine may include menu displays which prompt an operator of the data collection terminal 10 to supply data via the keyboard 14 to update requested status information on items of merchandise, or on a car, as in the car rental example.

The special purpose memory card 25 shown partially inserted into the connector port 24, in contrast, functions in a matter not contemplated by such state of the art memory cards. The purpose of the card 25 is to allow the operation of the data collection terminal 10 to distinctly deviate from its normal start-up routine. In one embodiment, the start-up or special purpose card 25 is shown to have on a lateral edge 27 a detenting notch 28. On insertion of the card 25 into the port 24, the notch or recess 28 operates a switch, such as switch 29 shown schematically in FIG. 4. The notch or recess 28 may be conveniently located as shown or may be disposed at any other convenient part of the card 25. Instead of the recess 28, a protrusion may be preferred, as may become apparent from the further description hereof. The switch 29 may be coupled according to one embodiment to an electronic switching circuit 30 (SW), for example by signal line 31, to condition the data collection terminal 10 for the special function provided by the special memory card 25. The card 25 contains pre-programmed start-up and operating instructions at a predetermined memory location of the card 25. The start-up instructions are intended to function as substitute start-up instructions for a microprocessor device 32 of the data collection terminal 10. The card 25 may further contain specialized microprocessor control code or application programs which, when accessed by the microprocessor 32, place the data collection terminal 10 into a unique operating mode to meet, for example, specific display and data input requirements of a particular business system, such as a car rental system, as an example. As is well known in the art, the operation of microprocessors is controlled by instructions which are fetched by the microprocessor 32 from designated memory locations of a bank of available memory. Without specific instructions for each operation, the microprocessor 32 cannot function. In accordance with state of the art, the microprocessor 32 is coupled to flash reprogrammable memory 33. If the flash reprogrammable memory 33 is coupled to occupy designated start-up memory locations, the start-up and at least the initial operating code sequences are located in the reprogrammable memory locations. Start-up instructions are those which initiate the operation of the microprocessor during the power-up of the microprocessor device 32. Start-up operations include the fetching of and operation on initial code, which may then direct the microprocessor 32 to other, specific operations which include the addressing of the remainder of available memory locations. By convention, the microprocessor 32 might select a memory location at the highest memory block (Hexadecimal FFFF0, for example) to obtain its initial instructions. Further microprocessor control or operating instructions may be specific system programs including an operating program known as BIOS. The start-up and initial instructions, when executed, might preferably direct the microprocessor 32 to proceed with such further system control instructions or operating programs. The further instructions including the BIOS program may therefore be located following start-up and initial operating instructions in address locations of the highest memory block of the reprogrammable flash memory 33 (FLASH ROM). The electronic switching circuit 30 is coupled to an address decode and memory programming card detect circuit 34 (ADDRESS DECODE MPCD) which under normal operation would direct the microprocessor 32 to the start-up instructions at such highest memory block address. Random access memory 35 (RAM) provides typical operating memory for temporary data and instruction storage while the data collection terminal 10 is operational. A memory card connector 36 (CN) is a functional element of the connector port 24. The connector port 24 may accept standard memory cards, such as the Personal Computer Memory Card International Association (PCMCIA) type cards that are commercially available. Data and address buses 37 and 38, respectively, communicatively interconnect memory and various peripheral devices into a functional microprocessor operating circuit. Peripheral functions, represented by peripheral device 39 (PI), are typically communicatively coupled to the data and address buses 37 and 38 of the microprocessor 32 and are controlled by specific control signals from the microprocessor 32. In executing its control and operating instructions, the microprocessor 32 establishes keyboard functions, display screen layouts, operator prompts, data communication routines, etc., to define predetermined operating characteristics of the data collection terminal 10. In accordance with a preferred embodiment of the invention, initial programming and updating of the start-up and operating instructions for the microprocessor 32, also referred to as the system software or system code, are implemented through the special purpose memory card 25. When the presence of the special purpose memory card 25 is detected, address signals are manipulated, as further described herein, to substitute the memory contents of the memory card 25 for any existing start-up instructions which might typically be resident in the reprogrammable memory 33 of the data collection terminal 10.

Figure 2:
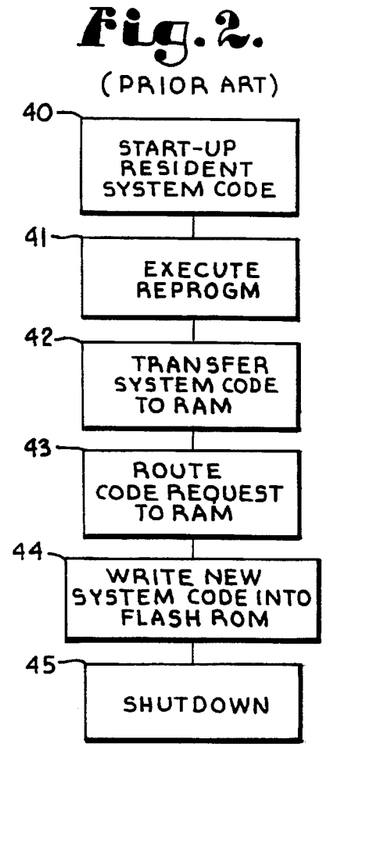
FIG. 2 is a flow chart of a prior art sequence for updating microprocessor control code in flash reprogrammable memory.
Figure 3:
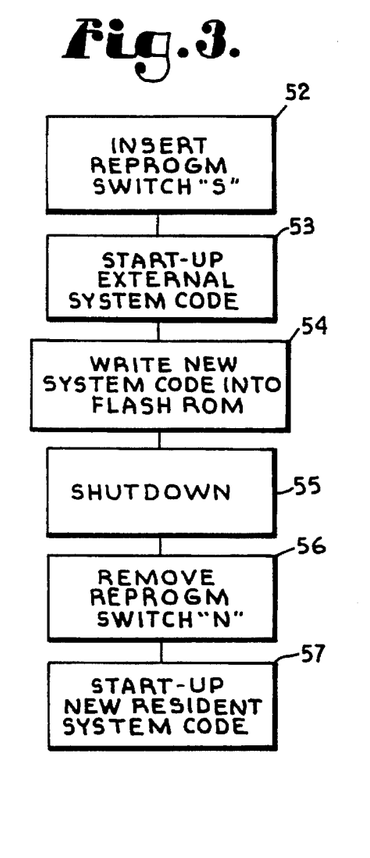
FIG. 3 is a flow chart for updating microprocessor control code in flash reprogrammable memory pursuant to the invention.

FIGS. 2 and 3 illustrate the distinction between presently known devices and processes for updating control code resident in reprogrammable flash ROM, as shown in FIG. 2, and a substitution of memory containing the specialized start-up and operating instructions for normally addressed start-up memory locations, according to the present invention, as illustrated in FIG. 3. A data collection terminal, such as the data collection terminal 10, would typically contain memory having a designated address for initial access by the microprocessor 32 to obtain the start-up code or code sequence. The start-up code sequence precedes any further required operating instructions for the microprocessor 32, such as those which are contained in the BIOS program. It may become necessary to make code changes affecting either the start-up instructions or other control code, including the BIOS which might typically reside in respective, predetermined memory locations of the data collection terminal 10. For example, one version of the BIOS program may need to be updated with a newer version, or it may be necessary to correct program errors, or to even change the operational characteristics of the data collection terminal 10 altogether.

Figure 4:
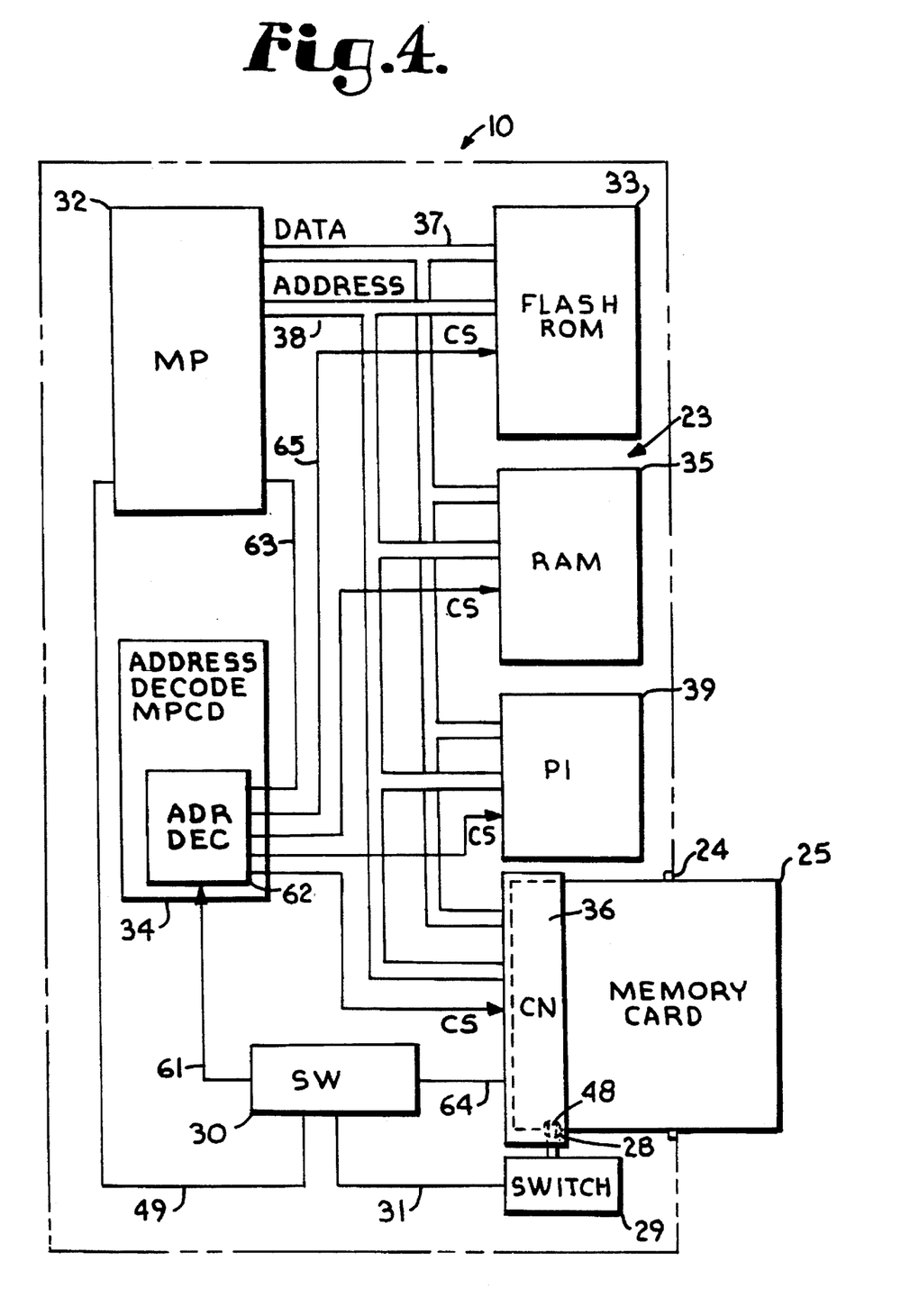
FIG. 4 is a functional block diagram of a data terminal including features of the invention.

According to the known art, the data collection terminal 10 would be powered up and the microprocessor 32 would become active by executing start-up instructions from the highest block of memory, for example, from the memory block 33 shown in FIG. 4. The normal start-up of the data collection terminal 10 under ROM-resident system code in accordance with existing art is represented in FIG. 2 by the first function block 40 ("START-UP RESIDENT SYSTEM CODE"). The microprocessor 32 begins to operate under existing start-up and operating instructions. To update the system software, an operator may direct the data collection terminal 10 to execute a particular updating program which may be identified by the name "REPROGM". The REPROGM program may be made accessible to the data collection terminal 10 through a data port to be read into existing memory, either from a conventional mass storage device, such as a disk drive coupled to the data collection terminal 10, or the program may be entered via a standard memory card, other than the special memory card 25. Parameters for such standard memory cards are currently sought to be established by the Personal Computer Memory Card International Association ("PCMCIA"). These standards seek to establish sizes, connection arrangements, usable memory areas, as well as other parameters, attempting to take into consideration the various applications that such memory cards may see in the future.

Once available in addressable memory, the REPROGM reprogramming program is executed as shown by the second block 41 of the functional steps depicted in the prior art sequence shown in FIG. 2. Running the REPROGM program may transfer all presently existing system operating code from the reprogrammable flash memory 33 to the random access memory 35 (RAM), as shown by the function 42 ("TRANSFER SYSTEM CODE TO RAM"). It is understood that a transfer of microprocessor operating instructions from the reprogrammable memory 33 to the random access memory block 35 may have taken place as part of the normal operating routines of the data collection terminal 10 after initial start-up. The REPROGM program may repeat such transfer of the operating instructions and then reroute all requests by the microprocessor 32 for further operating instructions from existing system code or BIOS to the RAM-residing copy of the system code or BIOS, as indicated by the next function block 43 ("ROUTE CODE REQUEST TO RAM"). The memory locations of the reprogrammable flash memory 33 which hold the original microprocessor start-up and operating instructions may now be overwritten with updated instructional code. Function block 44 indicates the execution of the updating function according to which the updated microprocessor start-up and operating instructions are written into the predetermined memory locations for storing the start-up and operating code for the microprocessor 32. Once the updating function 44 has been executed by the updating program REPROGM, the data collection terminal 10 may be shut off pursuant to block 45 ("SHUTDOWN"). The flash memory 33 now contains the new system code including start-up and BIOS code, which in turn imparts the new operating parameters to the data collection terminal 10 when the terminal is subsequently powered up again. A defect or drawback inherent in the known reprogramming routine becomes apparent when it is realized that any programming error which occurs during the writing of the new or updated start-up or operating instructions may render the data collection terminal 10 fatally defective for any subsequent operation. The probability of error increases with each code transfer operation. Error may be introduced when the old or existing system code is transferred to new RAM memory locations. Error may further be generated when requests for code by the microprocessor 32 are rerouted to the respective instructions at their new RAM memory locations. It is further likely that the new system code may include a heretofore undiscovered programming error that propagates itself to a fatal lock-up once the data collection terminal 10 begins to operate under the updated system code.

FIG. 3 shows a code updating sequence which differs from the prior art sequence described with respect to FIG. 2. Certain features referred to in the description of the sequence of FIG. 3 may also be visualized by further reference to FIG. 4. In contemplation of updating the flash memory 33 (FLASH ROM) with new start-up and operating code for the microprocessor 32, an operator inserts the special purpose memory card 25 into the card connector port 24 before the data collection terminal 10 is powered up. The special purpose memory card 25 contains an array of addressable memory locations which contain the new or substitute microprocessor start-up and operating instructions which are also collectively referred to as the new or substitute system code. Additionally, the memory card 25 preferably stores a reprogramming program (REPROGM) which, when executed, copies the new system code from the special purpose memory card 25 into designated memory locations of the flash reprogrammable memory 33.

The special purpose memory card 25 includes a special physical feature which interacts with a corresponding element in the data collection terminal 10 when the card 25 is inserted into the connector port 24. In a presently preferred embodiment, the physical feature of the memory card 25 may be the indentation or notch 28 in one of the longitudinal edges 27 of the memory card 25. The indentation or recess 28 permits a spring-loaded activating plunger 48 (see FIG. 4) to move into the recess 28, thereby causing an electrical closure of the mechanical switch 29. In further reference to FIG. 4, movement of the plunger 48 may be coupled to either open or close electrical contacts of the switch 29 to indicate the presence of the indentation 28. Depending on the logical state of the electronic signal desired at the electronic switching circuit 30, either a normally closed or a normally open contact may be wired to respond to the spring-activated movement of the plunger or activating lever 48 into the recess 28. The activation of the switch 29 applies a correspondingly selected signal to the electronic switching circuit 30. The switching circuit 30 may function, for example, similar to an exclusive OR-gate. The occurrence of the logical "1" signal from the switch 29, for example, would change the output state of the switching circuit 30 from a logical "0" to a logical "1" state. The occurrence of a further logical "1" input signal, for example, an input signal applied over an input line 49 from the microprocessor 32, would similarly restore the output or logical state of the switching device 30 to a logical "0" state. The second input signal to the electronic switching circuit 30 allows the switched state to be selectively overridden by a special microprocessor control instruction by the reprogramming program. The electronic switching circuit 30 may be coupled directly to chip select signal lines to provide for selective reversal of chip select signals from the address decode circuit 34. In a particular embodiment of the invention, memory addresses 67 of the reprogrammable memory device 33 and the memory addresses 68 of the removable memory card 25 become reversed or substituted for each other as the result of the activation of the mechanical switch 29 when the special purpose card 25 is inserted into the connector port 24.

FIG. 3 illustrates as a first step or function 52 (INSERT REPROGM SWITCH 'S') the insertion of the special purpose card 25 with the new start-up code and reprogramming program into the card connector port 24. The data collection terminal 10 may then be powered up. The physical switch 29 is already conditioned to indicate to the switching circuit 30 the presence of the special purpose card 25. The switching circuit 30 reroutes requests from the microprocessor circuit 32 for start-up code (the start-up code is normally found at the highest allocated memory block) such that the substitute start-up code and the substitute system instructions, to initiate and run the microprocessor circuit, are addressed on the special purpose card 25, as indicated by the function block 53 (START-UP EXTERNAL SYSTEM CODE). Upon running the REPROGM reprogramming program from respective memory on the card 25, the start-up code and the new system instructions or programs are transferred to or written into the assigned memory locations of the reprogrammable memory 33 (FLASH ROM, shown in FIG. 4) as shown by the function block 54 (WRITE NEW SYSTEM CODE INTO FLASH ROM). After the reprogramming program has completed the transfer of the substitute start-up and system code, the data collection terminal 10 may be turned off and the memory card may be removed pursuant to functions 55 and 56 (SHUTDOWN and REMOVE REPROGM SWITCH 'N') in FIG. 3. Prior to a subsequent start up of the data collection terminal 10, a regular memory card may be inserted into the card connector port 24. Standard memory cards according to the PCMCIA standard do not have a switch camming arrangement, either protrusion or recess, such as the recess 28. The switch 29 remains deactivated and the switching circuit 30 does not reroute access to instructions. Thus, with a standard memory card, whether it contains RAM or computer programs, the card memory occupies pre-designated addresses in the lower address order. The data collection terminal 10 consequently powers up, as shown at 57 (FIG. 3), in a normal manner under the start-up instructions and the updated system code located in the flash ROM 33 (FLASH ROM) shown in FIG. 4.

In further reference to FIG. 4, the switching circuit 30 provides an input signal on a signal line 61 to an address decode function 62 of the address decode circuit 34. The microprocessor circuit 32 is communicatively coupled to the address decode circuit 34, as shown by the signal line 63. Modes of operation which are considered feasible to implement the improved data collection terminal 10 and the process of updating microprocessor start-up and control code include a described switching of the addressing of the special memory card 25 namely memory addresses 68, and the normally addressed memory locations 67 of the flash reprogrammable memory 33 in substitution for each other.

When writing code into the reprogrammable flash memory 33 pursuant to the memory switch mode, the REPROGM program of the special memory card 25 instructs the microprocessor 32 to copy the new start-up and system instructions into designated memory locations 67 of the flash memory 33. However, while the special purpose memory card 25 remains coupled to the data collection terminal 10, these designated memory locations 67 are accessed by different address instructions than when the special memory card 25 has been removed from the terminal 10. The REPROGM consequently copies the start-up and other system control instructions under altered address instructions into those designated memory locations 67. Upon removal of the special memory card 25 from the card connector port 24, the data collection terminal 10 will again function in a normal operating mode. During the normal operating mode the designated memory locations 67 containing the newly copied start-up and operating code are addressable correctly by those addresses by which the microprocessor 32 would normally access the start-up and system instructions.

With the special purpose card 25 removed, the switching circuit 30 does not provide a signal to the decode circuit 34 which causes the substitutional switching of the special purpose memory card 25 and the reprogammable memory 33. As will be realized from FIG. 4, a signal applied by the switching circuit 30 to the address decode circuit 34 to signal the presence of the special purpose card 25 is preferably predicated on two sensed indications. One of the sensed indications and resulting signals is the result of the activation of the physical switch 29 when the plunger 48 moves into the recess 28 in the card 25. If the described recess 28 is used as an indicator (instead of a protrusion, for example), a second sensed indication is desirable to indicate the presence of any card in the card connector port 24. In the absence of a card, the plunger 48 would also be in an activated forward position. The second sensed signal may conveniently be achieved by direct electrical sensing of a signal through the connector port 24 itself, as indicated by a signal line 64. Other sensing provisions which combine the first and second card presence indicators into a single signal are, of course, possible, for example, by using a protrusion or by using a three-position indicator switch. When the switching circuit 30 is set, the address and data buses 38 and 37, respectively, carry out the control instructions pursuant to instruction read from the relocated memory locations. For example, activation of chip select lines 65 and 66 may be selectively reversed to reroute data and code retrievals. The addressing of the reprogrammable flash memory 33 and that of the special purpose card 25 would, under such operation, not affect addresses of any of the additional random access memory 35.

Another mode of implementing the features of the invention in the data collection terminal 10 is to change the memory address communicated by the decode circuit 34 by switching off the high order address lines. That procedure renders the affected memory locations inaccessible to the microprocessor 32. The memory address which is then communicated to the microprocessor 32 for obtaining the substitute start-up instructions corresponds to the predetermined address of the special purpose card 25. However, to write the new start-up and system code into the high address locations of the reprogrammable flash memory 33, the reprogramming program instructs the microprocessor 32 to reset the switching circuit 30 by a logic signal communicated through the signal line 49. After such reset, the reprogramming program reroutes control code instructions to the card 25, similar to routing of microprocessor control codes as when they are read from volatile memory pursuant to the prior art procedure described with respect to FIG. 2.

Figure 5:
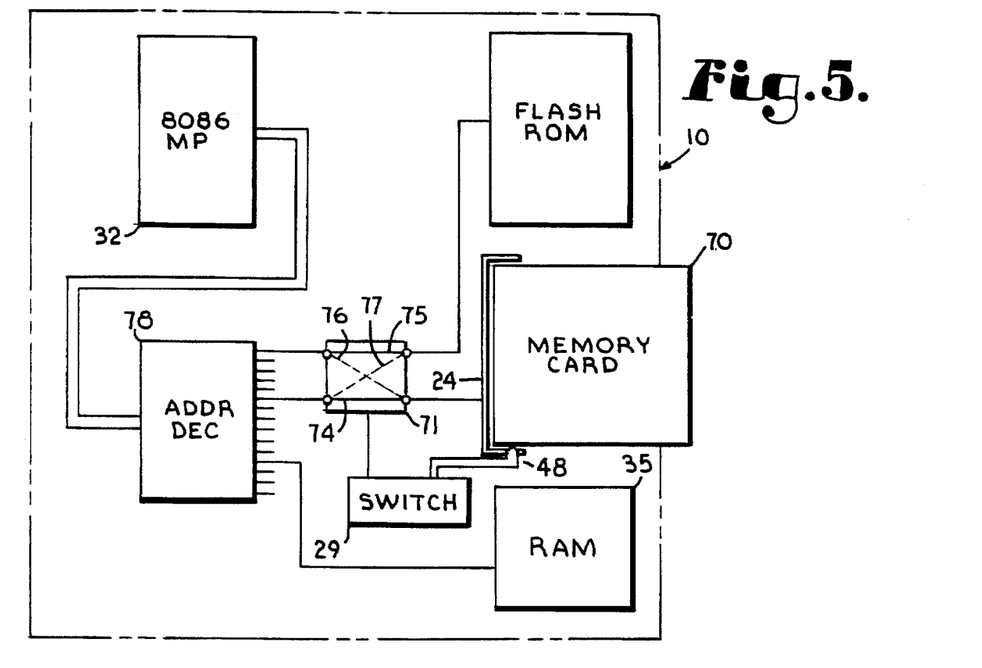
FIG. 5 shows a schematic block diagram of a preferred 8086 microprocessor switching arrangement of memory address instructions according to the invention.

FIG. 5 is a simplified schematic diagram depicting the discussed switching function, as it may be applied to an Intel 8086 microprocessor device 32, for example. A standard memory card 70 inserted into the port 24 does not activate the switch 29, such that a switching circuit 71 of chip enable switching signals remains also deactivated, as indicated by solid lines 74 and 75. On activation of the switch 29, the switching circuit 71 would also become activated to reroute chip enable signals via dashed signal lines 76 and 77, instead of via the solid signal lines 74 and 75, causing memory addresses to be switched as previously described. The switching function as described in reference to FIG. 5 remains invisible to an address decode circuit 78 itself.

Figure 6:
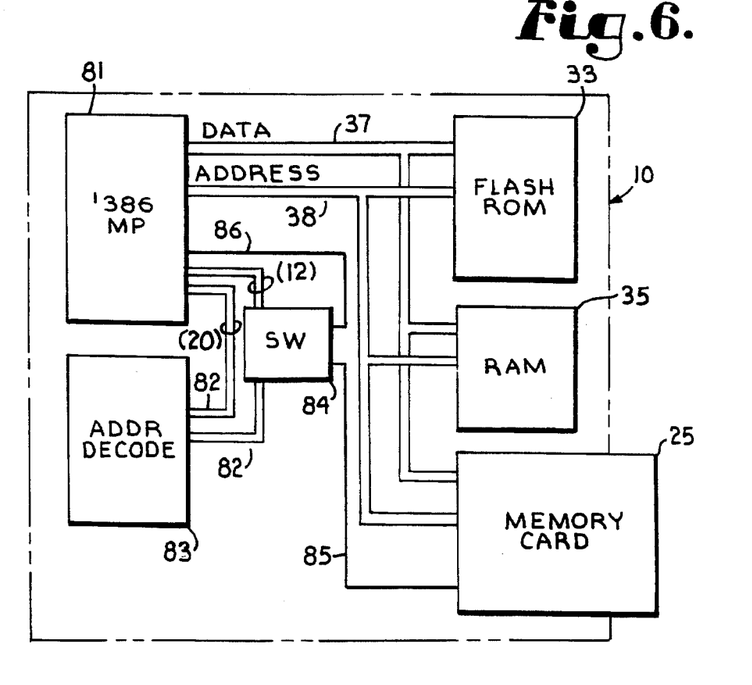
FIG. 6 shows a schematic block diagram of features of the invention in a 386 type microprocessor environment of a data terminal.
Figure 7:
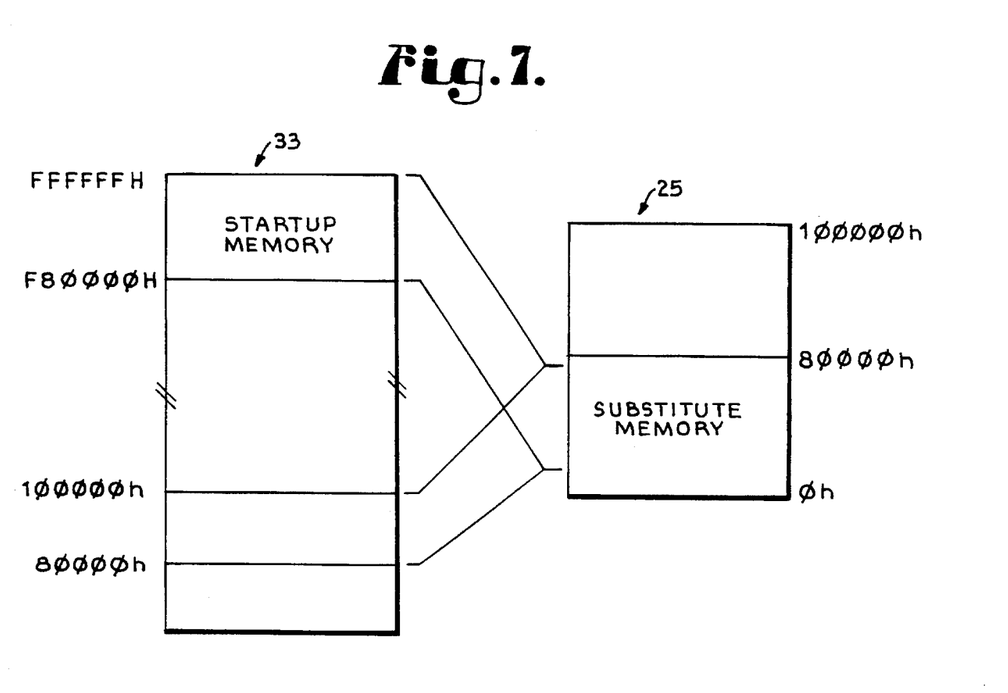
FIG. 7 shows a schematic block diagram of a memory map of various memory locations and the swapping or interconnection therebetween, according to the present invention.

FIG. 6 shows a variation of a switched function as it may be preferred when the data collection terminal 10 contains a 386 type microprocessor circuit 81 instead of a previously referred to 8086 microprocessor 32. Since a 386 type microprocessor is capable of addressing more memory than the 8086 microprocessor, and only 20 of 32 available address lines 82 are needed for data communication from the special purpose card 25, twelve of the address lines 82 from a decode circuit 83 are routed through a switching circuit 84, which is controlled by a physical recognition of the special purpose card 25 being present in the data collection terminal 10. A signal line 85 communicates the presence of the card 25 to the switching circuit 84 which switches off the twelve address signal lines 82, which are used to address the uppermost memory locations. The request for start-up code is therefore addressed by the microprocessor 81 directly to the special purpose memory card 25, the addresses of which are regarded as the highest memory addresses available. After the initial start up of the 386 microprocessor 81, a logic code applied to signal line 86 reactivates the twelve address lines 82 which were initially decoupled. Subsequent to such reactivation, the correct addresses for the flash memory 33, for the RAM 35 and for the special purpose card 25 are used by the microprocessor 81 to address respective locations in each of these memory sections. The transfer of new start-up code from the special purpose card 25 to the uppermost location of the reprogrammable ROM 33 would not take place until all of the address lines 82 have become reactivated by the control signal over line 86.

One of the advantages of updating the start-up and system code of the microprocessor, as described, is a reduced risk of error in executing the updating program because of the direct execution of the reprogramming routine from the special purpose card 25 which limits the updating process to a single direct transfer of new code from the card 25 to the reprogrammable flash memory 33.

A further advantage has also briefly been referred to, namely the advantage of overcoming a catastrophic failure because of an incidental error in the start-up or control code due to the transfer of updated start-up code or new BIOS to the data collection terminal 10.

Yet another advantage has been obtained by the described structure and code transfer process, which advantage is of significance in promoting mass assembly of the data collection terminals when the terminals have different operating requirements. Typically, according to prior art processes, data terminals, like the data collection terminal 10, were assembled in groups of various models or types, classified already during the physical assembly of the terminals to reflect their ultimate use or applications. Differently programmed ROM devices were typically installed as preprogrammed devices on separately designated specialty circuit boards. It becomes apparent from the foregoing description that the data collection terminals 10 can be assembled without containing any preprogrammed ROM microprocessor instructions in the flash reprogrammable memory 33. Thus, initially the reprogrammable memory 33 may be blank or containing no memory instructions, not even an initial start-up instruction for the microprocessor 32 to initialize the data collection terminal 10. Thus non-functional units may be physically assembled.

In a subsequent operation, any of the assembled data collection terminals 10 may be programmed to perform any of a number of desired specific functions by simply inserting a respective, special purpose memory card 25 into the respective connector port 24 of the data collection terminal 10, and initially programming the respective unit. Under such assembly procedure, the term "substitute start-up instruction" or "substitute BIOS" takes on the meaning of surrogate instruction or instructions, where the actual instructions have not yet been programmed into their respective memory locations. By initially programming the respective data collection terminals 10 from such substitute or surrogate code, a particular special purpose card 25 is used to initially dedicated any number of general purpose units to a special use. With initially unprogrammed data collection terminals 10, the cost of maintaining inventory of the terminals 10 is significantly reduced because of an opportunity to store only a single type terminal instead of a number of terminals for various uses. An order for a new commercial application of a data collection terminal 10 typically involves only minor modifications in display screen instructions. Adaptation of already existing formatting instructions limits the risk of programming errors, and the new data collection terminals are quickly removed from stock, are programmed and tested to significantly improve the typical turn around time for the delivery of such data collection terminals 10 with special requirements.

The memory switching or readdressing function has been described as being initiated by the camming notch or recess 28 in the special purpose memory card 25. In a broader sense, a switching circuit, such as the switching circuits 30, 71 or 84, can be activated or switched in any of a number of ways. A convenient alternative may be a mechanical switch, arranged similarly to the switch 29, except an operator or assembly worker would activate the switch manually, rather than as an integrated operation coinciding with the insertion of the card 25 into the card connector port 24. Such an alternate switch 29 may be a recessed slide switch accessed by use of a special tool to avoid accidental activation of the switch. The switch 29 (schematically shown in FIG. 5) may be modified accordingly to disable or override the actuation lever 48.

Advantages of imparting special functions after mechanical assembly of a general purpose apparatus is clearly not only applicable to portable data collection terminals, but applies generally to most types of microprocessor controlled apparatus. In general, microprocessor controlled apparatus which includes reprogrammable read only control memory may be constructed to include the described features to be programmed or reprogrammed in accordance herewith.

Also, the description of the invention in reference to a PCMCIA card standard and the description of the special purpose card containing the start up routine does not preclude other data input sources from being used to program or update microprocessor start-up or control code. The microprocessor accesses or obtains the initial start up instruction from an external source, the special purpose card 25 being only one example of such external source of stored code.

Consequently, various changes and modifications in the structure of the described embodiment and in the processes for programming or reprogramming microprocessor control code are possible without departing from the spirit and scope of the invention as set forth in the claims.

What is claimed is:

1. Microprocessor controlled apparatus comprising:

a microprocessor device and a microprocessor operating circuit, the microprocessor device communicatively coupled into the microprocessor operating circuit;

reprogrammable memory coupled into the microprocessor operating circuit to communicatively interact with the microprocessor device, the reprogrammable memory containing a plurality of addressable memory locations;

means for addressing designated ones of the memory locations of the reprogrammable memory for start-up operations of the microprocessor;

means for selectively coupling additional memory locations into the microprocessor operating circuit to communicatively interact with the microprocessor device;

means for substituting designated ones of the additional memory locations for the designated ones of the reprogrammable memory to be addressed by the addressing means for start-up operations of the microprocessor; and means for reversing the addresses of the designated ones of the memory locations of the reprogrammable memory having start-up operations of the microprocessor and the addresses of the additional memory locations having the start-up operations of the microprocessor.

2. Apparatus according to claim 1, wherein the means for selectively coupling additional memory locations into the microprocessor operating circuit comprises a memory card port including a memory card connector coupled to the microprocessor operating circuit, and means for sensing the presence of a memory card in the memory card port and coupled to the memory card connector, and wherein the means for substituting the designated ones of the additional memory locations comprises a switch means electrically coupled to the addressing means and selectively activatable for applying a switching function to the addressing means to couple the designated ones of the additional memory locations to the microprocessor in substitution for the designated locations of the reprogrammable memory.

3. Apparatus according to claim 1, wherein the means for selectively coupling additional memory locations into the microprocessor operating circuit comprises a memory card port including a memory card connector coupled to the memory operating circuit, and wherein the means for substituting the designated ones of the additional memory locations comprises switch means including sensing means for indicating the presence of a special purpose memory card in the memory card port and an electrical switching circuit responsive to input signals from the sensing means indicating the presence of a special purpose memory card in the memory card port, the electrical switching circuit coupled to the addressing means, for selectively addressing the designated ones of the additional memory locations instead of the designated ones of the reprogrammable memory.

4. Apparatus according to claim 3, wherein the sensing means comprises a switch disposed adjacent the memory card port, the apparatus further comprising a special purpose memory card insertible into the memory card port, the special purpose memory card including the designated ones of the additional memory locations with start-up instructions for the microprocessor, the card further comprising means interacting with the switch to condition the switch to indicate the presence of the special purpose memory card in the memory card port.

5. Apparatus according to claim 3, wherein the sensing means comprises means for sensing the presence of a memory card in the memory card port and a switch disposed adjacent the memory card port, the apparatus further comprising a special purpose memory card insertible into the memory card port, the special purpose memory card containing the designated ones of the additional memory locations and detent means interacting with the switch to condition the switch for indicating that a memory card present in the memory card port is the special purpose memory card.

6. Computerized data terminal apparatus comprising:
   a microprocessor circuit including a microprocessor and memory means interactively coupled for providing a plurality of memory locations to be addressed by the microprocessor while operating, the memory means comprising reprogrammable memory locations coupled to be initially addressed by the microprocessor on initial start-up, and thereby adapted to contain microprocessor start-up instructions;
   means for replaceably coupling additional memory means to the microprocessor circuit, the additional memory means including a second plurality of memory locations to be addressed by the microprocessor while operating, the additional memory means including predetermined memory locations containing substitute microprocessor start-Up and control instructions;
   means for selectively coupling the microprocessor to address the substitute microprocessor start-UP and control instructions in lieu of the reprogrammable memory locations to be initially addressed when the means for replaceably coupling has coupled the additional memory means to the microprocessor circuit; and
   means for reversing the addresses of the reprogrammable memory locations to be initially addressed and the addresses of the substitute microprocessor start-up and control instructions.

7. Apparatus according to claim 6, further comprising additional memory means including a second plurality of memory locations replaceably coupled by the replaceably coupling means to be addressed by the microprocessor while operating and having predetermined memory locations containing substitute microprocessor control instructions including a substitute initial microprocessor start-up code addressed initially by the microprocessor on start-up.

8. Apparatus according to claim 6, wherein the replaceably coupling means comprises a memory card port including a memory card connector coupled to the microprocessor circuit.

9. Apparatus according to claim 8, further comprising a special purpose memory card disposed in the memory card port and coupled to the memory card connector, the special purpose memory card including a second plurality of memory locations replaceably coupled into the microprocessor circuit and addressable by the microprocessor, the special purpose memory card having at least one predetermined memory location containing a substitute initial microprocessor start-up code and means for identifying the special purpose memory card as additional memory means including predetermined memory locations containing substitute microprocessor control instructions.

10. Apparatus according to claim 9, wherein the selectively coupling means comprises means for sensing the presence of any one memory card communicatively coupled to the memory card port and means for sensing the identifying means of the special purpose memory card.

11. Apparatus according to claim 9, wherein the identifying means of the special purpose memory card is an indentation disposed in the special purpose memory card, and the means for sensing the identifying means is a switch means disposed adjacent the memory card port, the switch means including an actuator means sensing the indentation in the special purpose memory card.

12. Apparatus according to claim 8, further comprising a special purpose memory card disposed in the memory card port and coupled to the memory card connector, the special purpose memory card including a second plurality of memory locations replaceably coupled into the microprocessor circuit and addressable by the microprocessor, the special purpose memory card having memory locations containing substitute microprocessor control instructions including initial microprocessor start-up instructions.

13. Apparatus according to claim 12, wherein the means for selectively coupling the microprocessor to address the substitute microprocessor control instructions comprises a switch means.

14. Apparatus according to claim 13, wherein the switch is manually activatable.

15. Apparatus according to claim 13, wherein the switch is activated by the insertion of the special purpose memory card into the memory card port.

16. A method of programming a computerized data terminal with microprocessor start-up and control instructions, comprising:
   coupling an external memory source to a microprocessor circuit including a microprocessor and addressable reprogrammable read only memory, the external memory source including start-up and control instructions for the microprocessor circuit;

switching the address routing from the addressable reprogrammable read only memory to the external memory source;

operating the microprocessor circuit under the control of the start-up and control instructions of the external memory source; and reversing the addresses of any microprocessor start-up and control instructions of the reprogrammable read only memory of the microprocessor circuit add the addresses of the start-up and control instructions of the external memory source.

17. The method according to claim 16, wherein the external memory source is a memory card, the card is coupled via a memory card port and connector to the microprocessor circuit, and the step of switching the address routing comprises substituting memory locations containing the start-up and control instructions for memory locations in the reprogrammable read only memory of the microprocessor circuit.

18. Microprocessor controlled apparatus comprising:

a microprocessor device and a microprocessor operating circuit, the microprocessor device communicatively coupled into the microprocessor operating circuit;

reprogrammable memory coupled into the microprocessor operating circuit to communicatively interact with the microprocessor device, the reprogrammable memory containing a plurality of addressable memory locations;

means for addressing designated ones of the memory locations of the reprogrammable memory for start-up operations of the microprocessor;

means for selectively coupling additional memory locations into the microprocessor operating circuit to communicatively interact with the microprocessor device; and means for substituting designated ones of the additional memory locations for the designated ones of the reprogrammable memory to be addressed by the addressing means for start-up operations of the microprocessor;

wherein the means for selectively coupling additional memory locations into the microprocessor operating circuit comprises a memory card port including a memory card connector coupled to the memory operating circuit, and wherein the means for substituting the designated ones of the additional memory locations comprises switch means including sensing means for indicating the presence of a special purpose memory card in the memory card port and an electrical switching circuit responsive to input signals from the sensing means indicating the presence of a special purpose memory card in the memory card port, the electrical switching circuit coupled to the addressing means for selectively addressing the designated ones of the additional memory locations instead of the designated ones of the reprogrammable memory; and wherein the switch means comprises means for reversing the addresses of the memory locations of the reprogrammable memory and the additional memory locations of memory selectively coupled into the microprocessor operating circuit.

\* \* \* \* \*